United States Patent
Pu

(10) Patent No.: US 12,127,282 B2
(45) Date of Patent: Oct. 22, 2024

(54) METHOD AND SYSTEM FOR DATA TRANSMISSION, CHIP, ELECTRONIC DEVICE, AND COMPUTER READABLE STORAGE MEDIUM

(71) Applicant: Shenzhen Goodix Technology Co., Ltd., Guangdong (CN)

(72) Inventor: Chuan Pu, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 331 days.

(21) Appl. No.: 17/567,104

(22) Filed: Dec. 31, 2021

(65) Prior Publication Data

US 2023/0010914 A1    Jan. 12, 2023

(30) Foreign Application Priority Data

Jul. 8, 2021    (CN) .......................... 202110771428.6

(51) Int. Cl.
*H04W 76/15*    (2018.01)
*H04W 4/80*    (2018.01)
(Continued)

(52) U.S. Cl.
CPC .............. *H04W 76/15* (2018.02); *H04W 4/80* (2018.02); *H04W 48/16* (2013.01); *H04W 72/30* (2023.01); *H04W 76/14* (2018.02)

(58) Field of Classification Search
None
See application file for complete search history.

(56) References Cited

U.S. PATENT DOCUMENTS

2015/0312858 A1* 10/2015 Kerai ................ H04W 52/0212
                                                                  370/311
2018/0098368 A1    4/2018 Wu et al.
(Continued)

FOREIGN PATENT DOCUMENTS

CN    108347716 A    7/2018
CN    112351412 A    2/2021
(Continued)

OTHER PUBLICATIONS

Bluetooth, "Bluetooth Core Specification Version 5.2 Feature Overview", Dec. 9, 2020, 37 pgs., Retrived from the Internet: URL:https://www.bluetooth.com/wp-content/uploads/2020/01/Bluetooth_5.2_Feature_Overview.pdf.

(Continued)

*Primary Examiner* — Hassan A Phillips
*Assistant Examiner* — Gautam Sharma
(74) *Attorney, Agent, or Firm* — USCH Law, PC

(57) ABSTRACT

The present disclosure provides a method and system for data transmission, chip, an electronic device, and a computer readable storage medium. The method applied at a first Bluetooth end includes: establishing a point-to-point connection with a second Bluetooth end; acquiring identity information of the second Bluetooth end through the point-to-point connection; and sending broadcast isochronous group information BIGInfo to the second Bluetooth end through the point-to-point connection when the identity information of the second Bluetooth end is verified, to enable the second Bluetooth end to receive a data stream of a broadcast isochronous group BIG sent by the first Bluetooth end according to the BIGInfo.

15 Claims, 10 Drawing Sheets

(51) Int. Cl.
*H04W 48/16* (2009.01)
*H04W 72/30* (2023.01)
*H04W 76/14* (2018.01)

(56) References Cited

U.S. PATENT DOCUMENTS

| | | | | |
|---|---|---|---|---|
| 2019/0098540 | A1* | 3/2019 | Lee | H04W 36/0085 |
| 2020/0044844 | A1* | 2/2020 | Sridhara | H04W 12/03 |
| 2020/0084697 | A1* | 3/2020 | Sridhara | H04W 4/06 |
| 2020/0275394 | A1* | 8/2020 | Lam | H04W 76/40 |
| 2022/0103607 | A1* | 3/2022 | Young | H04L 65/70 |
| 2022/0201452 | A1* | 6/2022 | Lee | H04B 5/77 |

FOREIGN PATENT DOCUMENTS

| | | |
|---|---|---|
| CN | 112469011 A | 3/2021 |
| CN | 112969174 A | 6/2021 |

OTHER PUBLICATIONS

Anonymous, "10 Frequently Asked Questions on LE Isochronous Channels | Bluetooth Technology Website", Mar. 2, 2020, 4 pgs., Retrieved from the Internet: URL:https://www.bluetooth.com/blog/10-frequently-asked questions-on-le-isochronous-channels/.

ZTE Corporation, Extended European Search Report, EP 21218218.2, May 30, 2022, 10pgs.

Shenzhen Goodix Technology Co., Ltd., CN First Office Action with English Translation, CN 202110771428.6, Aug. 13, 2021, 12 pgs.

Shenzhen Goodix Technology Co., Ltd., Notification to Grant Patent Right for Invention with English Translation, CN 202110771428.6, Sep. 7, 2021, 6 pgs.

Zhiqang Guo, et al., "Secure Constructing Bluetooth Scatternet Based on Bluetrees", Journal of Zhengzhou University (Natural Science Edition), vol. 39 No. 3, Sep. 17, 2007, 5 pgs.

* cited by examiner

METHOD AND SYSTEM FOR DATA TRANSMISSION, CHIP, ELECTRONIC DEVICE, AND COMPUTER READABLE STORAGE MEDIUM

CROSS-REFERENCE TO RELATED APPLICATION

The application claims priority to Chinese Patent Application No. 202110771428.6, filed on Jul. 8, 2021, the content of which is incorporated herein by reference in its entirety.

TECHNICAL FIELD

The present disclosure relates to the field of communication technologies, and in particular a method and system for data transmission, chip, an electronic device, and a computer readable storage medium.

BACKGROUND

With rapid development of communication technologies, a Bluetooth low energy (BLE) technology emerges. In broadcast audio technologies based on the BLE technology, audio data is sent to the broadcast in a form of a data stream of a broadcast isochronous group (BIG), and a first Bluetooth end (a sending device) in the BIG sends the data stream of the BIG using this connectionless manner, regardless of statuses of other second Bluetooth ends (receiving devices) in the BIG. The second Bluetooth end (the receiving device) may receive the data stream of the BIG and then play or use the data stream. In the BIG technology, the data stream of the BIG sent by one sending device may be received by a plurality of receiving devices within the BIG, which enables all the plurality of receiving devices to play audio of the same sending device.

However, the first Bluetooth end usually sends broadcast isochronous group information (BIGInfo) in a form of generating periodic broadcast based on extended broadcast when transmitting the data stream of the BIG, so that each second Bluetooth end may obtain the BIGInfo. As long as the second Bluetooth end is able to be synchronized with the periodic broadcast, the BIGInfo is acquired and the data stream of the BIG is received. The first Bluetooth end is unable to control the number of the second Bluetooth ends receiving the data stream the BIG, i.e., unable to realize that the data stream of the BIG is received by only a part of the second Bluetooth ends. Thus, a transmission process of the data stream of the BIG has poor privacy and security, and information of data stream of the BIG is easy to be stolen by an offender.

SUMMARY

Some embodiments of the present disclosure are intended to provide a method and system for data transmission, chip, an electronic device, and a computer readable storage medium, which provide the first Bluetooth end with a capability of selecting the second Bluetooth ends receiving a data stream of a BIG, thereby effectively improving privacy and security of a transmission process of the data stream of the BIG.

In order to solve the above problems, some embodiments of the present disclosure provide a method for data transmission, applied at a first Bluetooth end, which includes: establishing a point-to-point connection with a second Bluetooth end; acquiring identity information of the second Bluetooth end through the point-to-point connection; and sending broadcast isochronous group information (BIGInfo) to the second Bluetooth end through the point-to-point connection when the identity information of the second Bluetooth end is verified, to enable the second Bluetooth end to receive a data stream of a broadcast isochronous group (BIG) sent by the first Bluetooth end according to the BIGInfo; wherein sending the BIGInfo to the second Bluetooth end through the point-to-point connection includes: sending the BIGInfo of the BIG corresponding to the identity information of the second Bluetooth end to the second Bluetooth end through the point-to-point connection according to a pre-stored correspondence between the identity information and the BIG; wherein the identity information is configured to characterize a type of the second Bluetooth end.

Some embodiments of the present disclosure further provide a method for data transmission, applied at a second Bluetooth end, which includes: establishing a point-to-point connection with a first Bluetooth end; sending identity information of the second Bluetooth end to the first Bluetooth end through the point-to-point connection; and receiving a data stream of a broadcast isochronous group (BIG) sent by the first Bluetooth end according to broadcast isochronous group information (BIGInfo) sent by the first Bluetooth end after receiving the BIGInfo; wherein the first Bluetooth end sends the BIGInfo to the second Bluetooth end through the point-to-point connection when the identity information of the second Bluetooth end is verified; wherein the BIGInfo sent by the first Bluetooth end includes BIGInfo of the BIG corresponding to the identity information of the second Bluetooth end, and wherein the identity information is configured to characterize a type of the second Bluetooth end.

Some embodiments of the present disclosure further provide a system for data transmission, which includes: a first Bluetooth end and a second Bluetooth end; wherein the first Bluetooth end establishes a point-to-point connection with the second Bluetooth end; the first Bluetooth end is configured to acquire identity information of the second Bluetooth end through the point-to-point connection, and transmit broadcast isochronous group information (BIGInfo) to the second Bluetooth end through the point-to-point connection when the identity information of the second Bluetooth end is verified; and the second Bluetooth end is configured to transmit the identity information of the second Bluetooth end to the first Bluetooth end through the point-to-point connection, and receive a data stream of a broadcast isochronous group (BIG) sent by the first Bluetooth end according to the BIGInfo sent by the first Bluetooth end after receiving the BIGInfo; wherein sending the BIGInfo to the second Bluetooth end through the point-to-point connection includes: sending the BIGInfo of the BIG corresponding to the identity information of the second Bluetooth end to the second Bluetooth end through the point-to-point connection according to a pre-stored correspondence between the identity information and the BIG; wherein the identity information is configured to characterize a type of the second Bluetooth end.

Some embodiments of the present disclosure further provide a chip which includes a processing module and a memory module; wherein the memory module stores instructions executable by the processing module, and the instructions, when executed by the processing module, cause the processing module to perform the method for data transmission, wherein the chip includes the first Bluetooth end or the second Bluetooth end.

Some embodiments of the present disclosure further provide an electronic device including the chip and a Bluetooth antenna connected to the chip.

Some embodiments of the present disclosure further provide a computer readable storage medium storing a computer program, wherein the computer program, when executed by a processor, causes the processor to perform the method for data transmission applied at the first Bluetooth end or the method for data transmission applied at the second Bluetooth end.

Compared with a method that the first Bluetooth end sends a connectionless periodic broadcast carrying the BIGInfo, and any one of second Bluetooth ends is able to acquire the BIGInfo from the received periodic broadcast to receive the data stream of the BIG, in the embodiments of the present disclosure, the first Bluetooth end establishes the point-to-point connection with the second Bluetooth end, acquires the identity information of the second Bluetooth end through the point-to-point connection, and only sends the BIGInfo to the second Bluetooth end of which the identity information is verified through the point-to-point connection, i.e., only the second Bluetooth end of which the identity information is verified is able to receive the data steam of the BIG, so that the first Bluetooth end has the capability of selecting the second Bluetooth ends receiving the data stream of the BIG, thereby effectively improving the privacy and security of the transmission process of the data stream of the BIG. In addition, in the embodiments of the present disclosure, the BIGInfo is sent to the second Bluetooth end through the point-to-point connection only when the identity information of the second Bluetooth end is verified. Compared with the technical solution that the BIGInfo needs to be carried in each periodic broadcast that is periodically sent, the bandwidth occupied in the embodiments of the present disclosure is relatively small, and radio resources is saved.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

Figure 1:
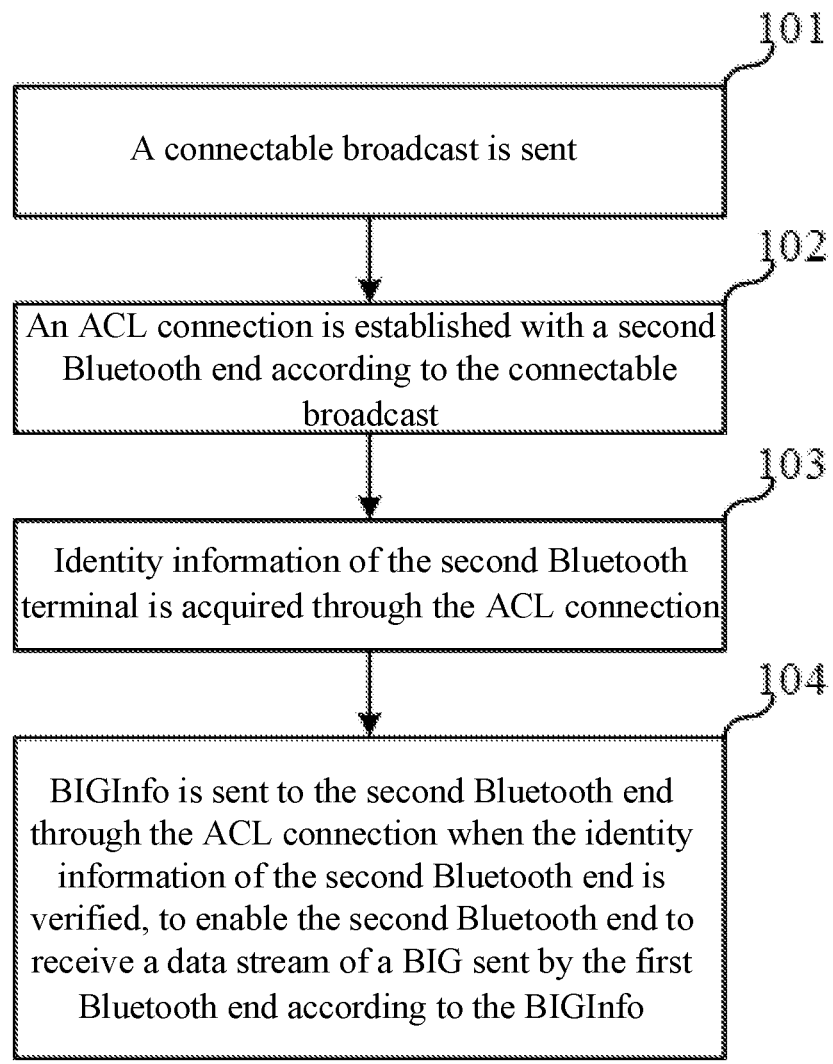
FIG. 1 is a flowchart 1 of a method for data transmission provided in an embodiment of the present disclosure.

In order to make objectives, technical solutions, and advantages of the present disclosure clearer, embodiments of the present disclosure will be described below in detail with reference to accompanying drawings and embodiments. It should be understood by persons of ordinary skill in the art that in various embodiments, many technical details are proposed for the reader to better understand the present disclosure. However, the technical solutions claimed in the present disclosure may be realized even without these technical details and various changes and modifications based on the following embodiments. The following embodiments are divided for convenience of description, and shall not constitute any limitation on specific implementations of the present disclosure. The embodiments may be referenced to each other and combined with each other without contradiction.

In related broadcast audio technologies based on a BLE technology, a sending device may transmit data in a form of broadcast by transmitting a data stream of a BIG based on a broadcast isochronous stream (BIS) protocol, and the sending device may transmit synchronous data in this connectionless manner, regardless of statuses of other devices (i.e., receiving devices). The receiving devices may receive the data stream of the BIG based on the BIS protocol. The data transmitted by the sending device may be received by a plurality of receiving devices, thereby enabling all the plurality of receiving devices to play audio data of the same sending device.

When the sending device needs to send the data stream of the BIG, the BIG needs to be created first. Based on the data stream of the created BIG, the sending device also needs to create a periodic broadcast related to the created BIG. Contents in the periodic broadcast includes BIGInfo. Then, the sending device continuously sends the data stream of the BIG and the periodic broadcast according to a period of the data stream of the BIG and a period of the periodic broadcast.

The receiving device may scan the broadcast at air interfaces at any time, be synchronized with the periodic broadcast created by the sending device if the created periodic broadcast is scanned, parse the periodic broadcast to acquire the BIGInfo, and calculate information of the data stream of the BIG sent by the first Bluetooth end through the BIGInfo, such as a period, frequency modulation parameter, current channel and timing, and the like. The second Bluetooth end adjusts its own parameters according to the calculated information so that the second Bluetooth end periodically receives the data stream of the BIG according to a rhythm of the first Bluetooth end sending the data stream of the BIG. In the transmission process, the data stream of the BIG sent by the first Bluetooth end is only responsible for bearing data, and the second Bluetooth end needs to receive the data stream of the BIG according to the BIGInfo before acquiring the data contained in the data stream of the BIG if the second Bluetooth end is desired to acquire the data contained in the data stream of the BIG.

Thus, the first Bluetooth end is only responsible for sending, and a synchronization process of the second Bluetooth end is only a process of getting the BIGInfo and adjusting the parameters of the second Bluetooth end according to the BIGInfo. Therefore, increase or decrease of the number of the second Bluetooth ends does not affect the first Bluetooth end, and in theory, it is possible to realize that an infinite plurality of second Bluetooth ends all receive the data stream of the BIG sent by the first Bluetooth end. For example, in an airport, an airport announcement is sent by the first Bluetooth end in the form of the data stream of the BIG, and each airport passenger has a second Bluetooth end (such as a mobile phone). As long as the second Bluetooth end enters a coverage of the airport, the second Bluetooth is able to be synchronized with the periodic broadcast in the airport so as to obtain the BIGInfo, thereby being synchronized with the data stream of the BIG so as to obtain the airport announcement.

The inventor of the present disclosure found that in some cases, the data stream of the BIG sent by the first Bluetooth end is only desired to be received by a part of the second Bluetooth ends. For example, in the airport, the airport announcement is sent by the first Bluetooth end in the form of the data stream of the BIG, and each airport passenger has a second Bluetooth end (such as the mobile phone). The airport announcement is only desired to be received by second Bluetooth ends of VIP users, and is unable to be received by second Bluetooth ends of ordinary users. In the related technologies, since the second Bluetooth ends does not affect the first Bluetooth end, the first Bluetooth end is unable to control the number of the second Bluetooth ends receiving the data stream of the BIG, and is unable to realize that only a part of the second Bluetooth ends receives the data stream of the BIG, which results in poor privacy and security in a transmission process of the data stream of the BIG, so that information of the data stream of the BIG is easily stolen by an offender.

In order to solve the above problems of poor privacy and security in the transmission process of the data stream of the BIG which is easy to be stolen by the offender, an embodiment of the present disclosure provides a method for data transmission applied at a first Bluetooth end, as shown in FIG. 1, which includes the following operations.

In 101, a connectable broadcast is sent.

In implementation, the connectable broadcast sent by the first Bluetooth end may be a connectable broadcast supporting an asynchronous connection-oriented logical transport (ACL) connection.

In 102, an ACL connection is established with a second Bluetooth end according to the connectable broadcast.

In 103, identity information of the second Bluetooth terminal is acquired through the ACL connection.

In 104, BIGInfo is sent to the second Bluetooth end through the ACL connection when the identity information of the second Bluetooth end is verified, to enable the second Bluetooth end to receive a data stream of a BIG sent by the first Bluetooth end according to the BIGInfo.

In an example, the first Bluetooth end internally stores a preset identity information standard of the second Bluetooth end, and may verify the identity information of the second Bluetooth end after acquiring the identity information of the second Bluetooth end. As long as the identity information of the second Bluetooth end conforms to the preset identity information standard of the second Bluetooth end, the first Bluetooth end may send the BIGInfo to the second Bluetooth end. The BIGInfo sent by the first Bluetooth end to each second Bluetooth end is the same.

In the embodiment of the present disclosure, the first Bluetooth end establishes the ACL connection with the second Bluetooth end by sending the connectable broadcast, acquires the identity information of the second Bluetooth end through the established ACL connection, and only sends the BIGInfo to the second Bluetooth end whose identity information is verified through the ACL connection, i.e., only the second Bluetooth end whose identity information is verified is able to receive the data steam of the BIG, so that the first Bluetooth end has the capability of selecting the second Bluetooth end receiving the data stream of the BIG, thereby effectively improving the privacy and security of the transmission process of the data stream of the BIG. In addition, in the embodiment of the present disclosure, the first Bluetooth end sends the BIGInfo to the second Bluetooth end only when the identity information of the second Bluetooth end is verified, and the BIGInfo does not need to be carried in the connected broadcast. Compared with the technical solution in which the BIGInfo needs to be carried in each periodic broadcast that is periodically sent, a bandwidth occupied in the embodiment of the present disclosure is relatively small and radio resources are saved.

In an embodiment, that sending the connectable broadcast in 101 is not necessary, and that establishing the ACL connection with the second Bluetooth end according to the connectable broadcast in 102 is also not necessary. For example, for typical Bluetooth (BT), the connectable broadcast is not required for the first Bluetooth end, and the first Bluetooth end may acquire identity information of the second Bluetooth end through a synchronous connection-oriented logical transport (SCO) connection, and then send BIGInfo to the second Bluetooth end through the SCO connection. For single-mode Bluetooth that only supports BT, the first Bluetooth end may implement the present technical solution through the SCO connection. For dual-mode Bluetooth, i.e., a Bluetooth device supporting both BLE and BT, the first Bluetooth end may implement the present technical solution through the SCO or the ACL connection. For a Bluetooth device that only supports BLE, the first Bluetooth end may implement the present technical solution through the ACL, and the following embodiments are illustrated by implementing the present technical solution through the ACL.

In an embodiment, operations 101 and 102 are configured to establish a point-to-point connection between the first Bluetooth end and the second Bluetooth end, and then transmit the identity information and the BIGInfo through the point-to-point connection, without necessarily establishing the ACL connection to transmit the identity information and the BIGInfo.

In an embodiment, in 104, the first Bluetooth end sends the BIGInfo to the second Bluetooth end through the ACL connection, and sends the BIGInfo of the BIG corresponding to the identity information of the second Bluetooth end to the second Bluetooth end through the ACL connection according to a pre-stored correspondence between the identity information and the BIG. In this embodiment, for a BLE device, the identity information of the second Bluetooth end is acquired through the ACL connection and the BIGInfo is sent to the second Bluetooth end through the ACL connection, which simplify the transmission process compared with acquiring and sending through other point-to-point connections, e.g., the SCO connection.

In implementation, the first Bluetooth end may internally pre-store correspondences between the identity information of second Bluetooth ends and BIGs, and establish a plurality of BIGs according to the correspondences between the identity information of the second Bluetooth ends and the BIGs, each BIG has its own dedicated BIGInfo. The first Bluetooth end may send BIGInfo of a BIG corresponding to identity information of a second Bluetooth end to the second Bluetooth end through the ACL connection after the first Bluetooth end determines that the identity information of the second Bluetooth end has been verified. That is, the second Bluetooth ends of different identity information have different received BIGInfo, which means the BIGs in which the second Bluetooth ends join are different. A second Bluetooth end is able to receive only BIGInfo of a BIG corresponding to its own identity information, and thus, is able to receive only a data stream of the BIG corresponding to its own identity information while being unable to receive data streams of BIGs corresponding to other identity information, thereby further improving privacy and security of the transmission process of the data stream of the BIG.

For example, the first Bluetooth end needs to send an airport announcement for a VIP user and an airport announcement for an ordinary user. The first Bluetooth end may establish two BIGs based on the VIP user and the ordinary user. The first Bluetooth end sends a data stream of a first BIG including the airport announcement for the VIP user in the first BIG, and sends a data stream of a second BIG including the airport announcement for the ordinary user in the second BIG. The first Bluetooth end determines a type of the identity information of the second Bluetooth end after the identity information of the second Bluetooth end is verified. If the second Bluetooth end is the VIP user, BIGInfo of the BIG corresponding to the VIP user (i.e., the BIGInfo of the first BIG) is sent to the second Bluetooth end. If the second Bluetooth end is the ordinary user, BIGInfo of the BIG corresponding to the ordinary user (i.e., the BIGInfo of the second BIG) is sent to the second Bluetooth end.

In addition, in a technical solution in which the BIGInfo needs to be carried in each periodic broadcast periodically sent, the first Bluetooth end sends the periodic broadcast to send the BIGInfo, thus the first Bluetooth end is unable to know when the second Bluetooth end is synchronized with the periodic broadcast to acquire the BIGInfo, that is, the first Bluetooth end does not know when the second Bluetooth end requires the data stream of the BIG. The first Bluetooth end needs to calculate the BIGInfo once in each period of the periodic broadcast to ensure that the second Bluetooth end is capable of obtaining the BIGInfo. However, in the embodiment of the present disclosure, the first Bluetooth end establishes the ACL connection with the second Bluetooth end, and acquires the identity information of the second Bluetooth end sent from the second Bluetooth end through the ACL connection. The second Bluetooth end sends its own identity information to the first Bluetooth end when requiring the data stream of the BIG, so when the second Bluetooth end requires the BIGInfo is known to the first Bluetooth end, and thus the BIGInfo can be obtained at this time through calculation. In this way, a calculation amount is relatively small, which effectively reduces power consumption of the first Bluetooth end.

In an embodiment, the BIGInfo sent by the first Bluetooth end to the second Bluetooth end is encrypted by a first key, and the first key is obtained according to the identity information of the second Bluetooth end and the identity information of the first Bluetooth end.

In implementation, the first Bluetooth end may generate the first key in real time based on a preset encryption method with reference to the identity information of the second Bluetooth end and the identity information of the first Bluetooth end before sending the BIGInfo, encrypts the BIGInfo according to the first key, and then sends the encrypted BIGInfo to the second Bluetooth end through the ACL connection. Since identity information of different second Bluetooth ends is different, first keys generated based on the preset encryption method with reference to the identity information of the second Bluetooth end and the identity information of the first Bluetooth end are different, and ciphertext information obtained by encrypting the BIGInfo according to the first keys is also different. The preset encryption method may be set for the Bluetooth end at the time of factory shipment, or may be obtained by downloading corresponding software, thereby ensuring that the second Bluetooth end knows which preset encryption method the first Bluetooth end is encrypted based on. Therefore, only the second Bluetooth end receiving the encrypted BIGInfo is capable of decrypting the encrypted BIGInfo, and the encrypted BIGInfo may be stolen only when the preset encryption method, the identity information of the second Bluetooth end, and the identity information of the first Bluetooth end are simultaneously stolen. The embodiment of the present disclosure effectively improves the difficulty of information disclosure caused by the encrypted BIGInfo being cracked by the offender, thereby further improving the privacy and security of the transmission process of the data stream of the BIG.

In an example, the identity information of the second Bluetooth end may be an ID of the second Bluetooth end, a device model of the second Bluetooth end, or the like, which is not specifically limited in this embodiment of the present disclosure.

In an embodiment, the first Bluetooth end may also encrypt the BIGInfo directly according to the preset key, and send the preset key to the second Bluetooth end through the established connection for the second Bluetooth end to decrypt the BIGInfo encrypted by the preset key.

In an embodiment, the data stream of the BIG is encrypted by a preset second key, the BIGInfo includes the second key, and the second Bluetooth end may decrypt the data stream of the BIG encrypted by the second key according to the second key in the BIGInfo after receiving the data stream of the BIG sent by the first Bluetooth end.

In implementation, the second key included in the BIGInfo may be a group initialization vector (GIV), or may be a group session key diversifier (GSKD), which is not specifically limited in this embodiment of the present disclosure.

In an embodiment, the first Bluetooth end may encrypt the BIGInfo according to the first key, and encrypt the data stream of the BIG by using the preset second key. The first key is obtained in real time according to the identity information of the first Bluetooth end and the identity information of the second Bluetooth end. The second key is a preset GIV or GSKD, and the first key is different from the second key, so that two different encryptions of the transmission process of the data stream of the BIG are realized, thereby further improving the privacy and security of the transmission process of the data stream of the BIG.

Figure 2:
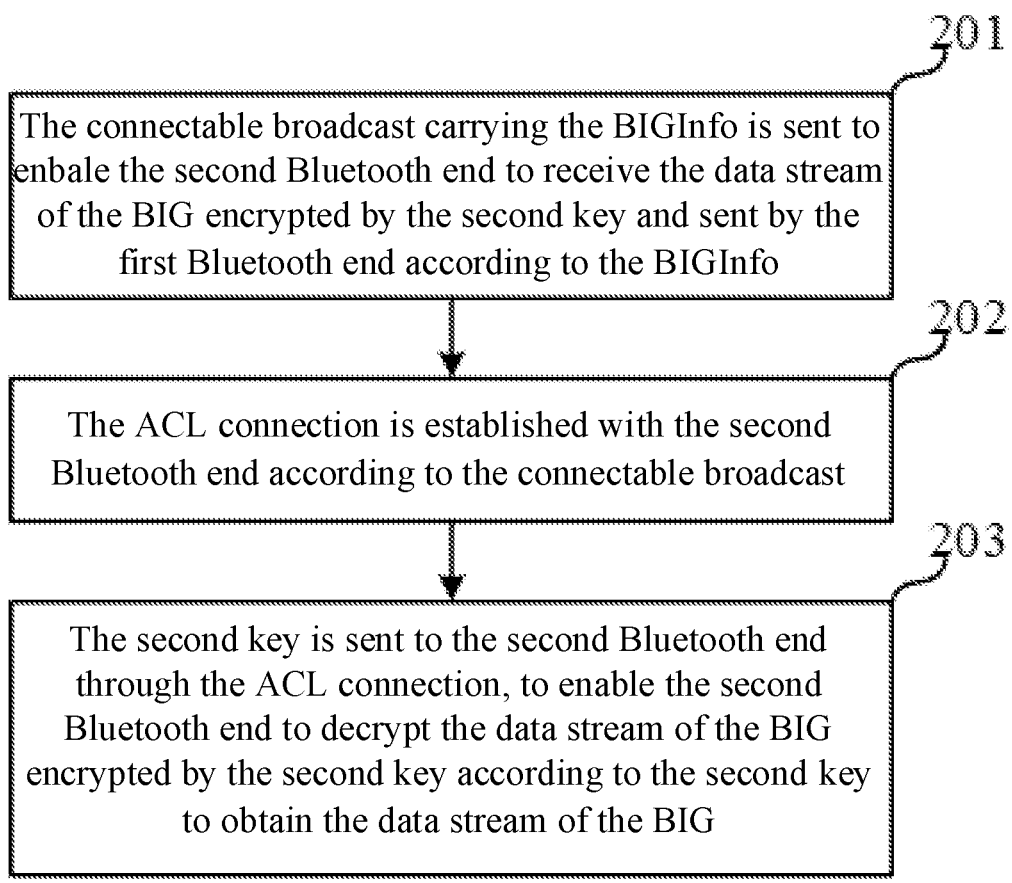
FIG. 2 is a flowchart 2 of a method for data transmission provided in an embodiment of the present disclosure.

In an embodiment, the data stream of the BIG is encrypted by the second key. The method for data transmission in this embodiment is shown in FIG. 2, which includes the following operations.

In 201, the connectable broadcast carrying the BIGInfo is sent to enable the second Bluetooth end to receive the data stream of the BIG encrypted by the second key and sent by the first Bluetooth end according to the BIGInfo.

In 202, the ACL connection is established with the second Bluetooth end according to the connectable broadcast.

In 203, the second key is sent to the second Bluetooth end through the ACL connection, to enable the second Bluetooth end to decrypt the data stream of the BIG encrypted by the second key according to the second key to obtain the data stream of the BIG.

In implementation, the first Bluetooth end may carry the BIGInfo in the connectable broadcast, so that the second Bluetooth end acquires the BIGInfo to obtain the data stream of the BIG encrypted by the second key. The first Bluetooth end may establish the ACL connection with the second Bluetooth end according to the connectable broadcast, and send the second key to the second Bluetooth end through the ACL connection. Only the second Bluetooth end receiving the second key is capable of decrypting the data stream of the BIG encrypted by the second key and acquire the data stream of the BIG, so that the first Bluetooth end has the capability of selecting the second Bluetooth ends receiving the data stream of the BIG, thereby effectively improving the privacy and security of the transmission process of the data stream of the BIG. The second key may be obtained in real time based on the identity information of the first Bluetooth end and the identity information of the second Bluetooth end, or may be preset by a person skilled in the art according to actual needs.

In an embodiment, the first Bluetooth end may first create an extended broadcast, and then create the periodic broadcast based on the extended broadcast, and carry the BIGInfo in the periodic broadcast, so that the second Bluetooth end acquires the BIGInfo. Meanwhile, the first Bluetooth end creates the connectable broadcast, establishes the ACL connection with the second Bluetooth end according to the connectable broadcast, and sends the second key to the second Bluetooth end through the ACL connection, so that the second Bluetooth end decrypts the data stream of the BIG encrypted by the second key according to the second key to acquire the data stream of the BIG.

Figure 3:
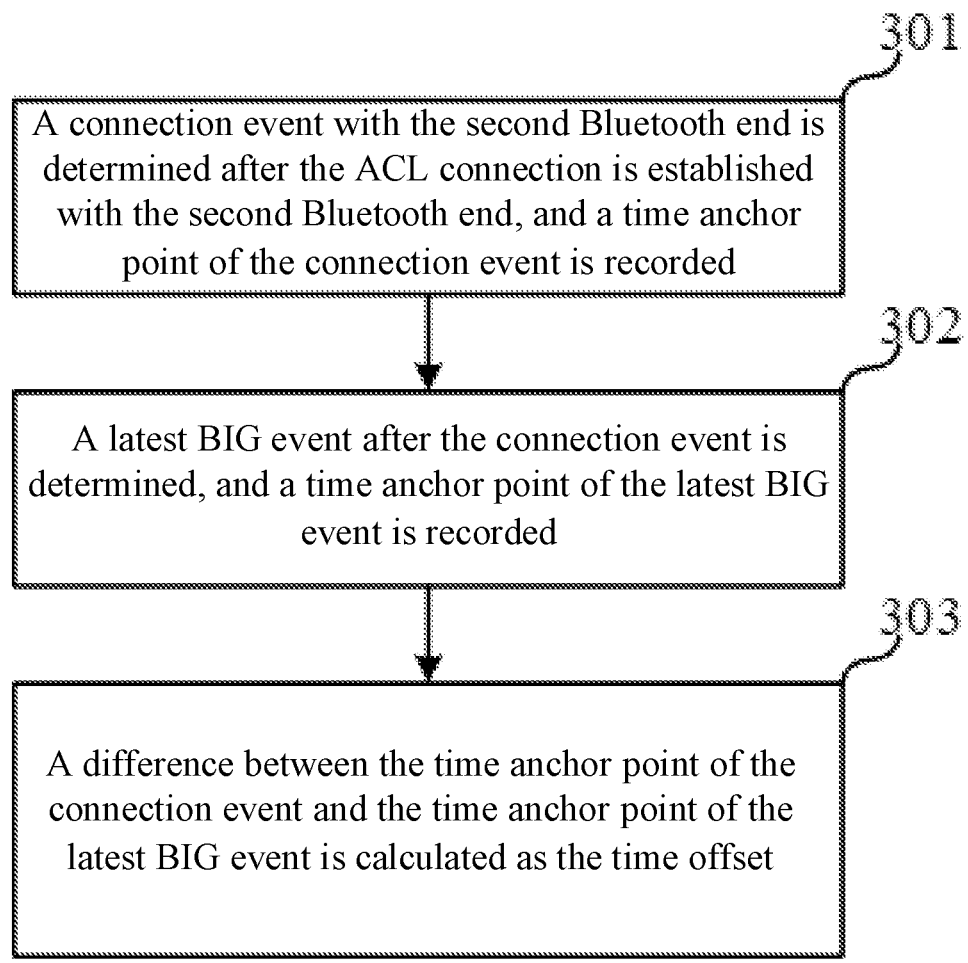
FIG. 3 is a flowchart 1 of sending BIGInfo to a second Bluetooth end provided in to an embodiment of the present disclosure.

In an embodiment, the sending of the BIGInfo to the second Bluetooth end may be implemented by operations shown in FIG. 3 as follows.

In 301, a connection event with the second Bluetooth end is determined after the ACL connection is established with the second Bluetooth end, and a time anchor point of the connection event is recorded.

Figure 4:
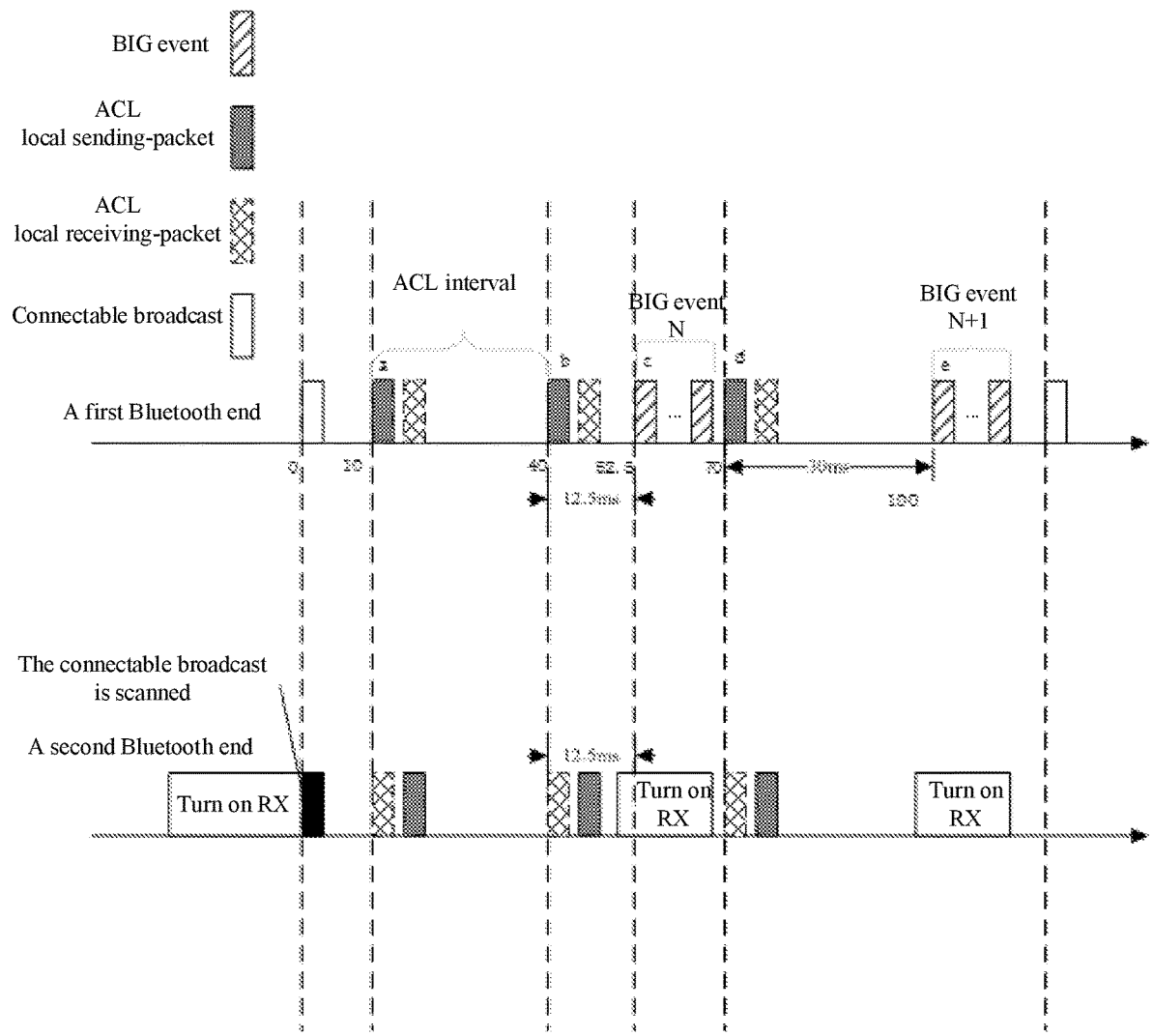
FIG. 4 is a schematic diagram of determining a time offset provided in an embodiment of the present disclosure.

The first Bluetooth end and the second Bluetooth end may communicate based on the connection event of the ACL. After the connection between the first Bluetooth end and the second Bluetooth end is established, frequency hopping occurs continuously, and each time frequency hopping occurs, one connection event occurs. Both the first Bluetooth end and the second Bluetooth end have an internal connection event counter, and the connection event counters in the first Bluetooth end and the second Bluetooth end synchronously count connection events of the ACL. Each connection event has a duration, and the first Bluetooth end and the second Bluetooth end transmit data within the duration of each connection event. As shown in FIG. 4, an event 'a' is a connection event.

In implementation, the first Bluetooth end may determine a connection event with the second Bluetooth end after the ACL connection is established with the second Bluetooth end, and may record the time anchor point of the connection event. The time anchor point of the connection event is a time point at which the connection event starts.

In an example, as shown in FIG. 4, the connection between the first Bluetooth end and the second Bluetooth end has been established at 10 ms, and the connection event between the first Bluetooth end and the second Bluetooth end determined after establishing the ACL connection with the second Bluetooth end is the event 'a'. Considering that there is a delay in the data transmission, a second connection event between the first Bluetooth end and the second Bluetooth end determined after establishing the ACL connection with the second Bluetooth end may be selected as, for example, an event 'b' to prevent a case where a time offset obtained due to the data transmission delay is unable to play a role.

In an example, as shown in FIG. 4, the first Bluetooth end starts to send the connectable broadcast, so that the second Bluetooth end scans the connectable broadcast and establishes the ACL connection. The first Bluetooth end marks the time for starting to send the connectable broadcast as 0 ms. The second Bluetooth end may always turn on a communication receiving (RX) unit, and scan the connectable broadcast after the first Bluetooth end starts to send the connectable broadcast. The first Bluetooth end establishes the ACL connection with the second Bluetooth end, and confirms that the ACL connection has been established at 10 ms. The first Bluetooth end performs necessary interaction with the second Bluetooth end in the event 'a', keeps the connection continuously, determines that the event 'b' is the connection event with the second Bluetooth end after establishing the ACL connection with the second Bluetooth end, and records the time anchor point of the event 'b' as 40 ms.

In 302, a latest BIG event after the connection event is determined, and a time anchor point of the latest BIG event is recorded.

In implementation, after the first Bluetooth end determines the connection event with the second Bluetooth end after establishing the ACL connection with the second Bluetooth end, the time anchor point of the latest BIG event after the connection event may be found according to the time anchor point of the connection event with the second Bluetooth end after the ACL connection is established with the second Bluetooth end. The time anchor point of the latest BIG event is a time point at which the latest BIG event starts.

In an example, as shown in FIG. 4, if the connection event with the second Bluetooth end determined by the first Bluetooth end after establishing the ACL connection with the second Bluetooth end is the event a server determines that a latest BIG event after the event 'b' is an event 'c', and determines that a time anchor point of the event 'c' is 52.5 ms. If the connection event with the second Bluetooth end determined by the first Bluetooth end after establishing the ACL connection with the second Bluetooth end is the event 'd', a server determines that a latest BIG event after the event 'd' is an event 'e', and determines that a time anchor point of the event 'e' is 100 ms.

In an example, as shown in FIG. 4, a time slot of the ACL connection is 30 ms, a period of the data stream of the BIG is 47.5 ms, the event 'e' is a BIG event, and the time anchor point of the event 'e' is 100 ms. Although the connection event and the BIG event start at the same time point, the connection event and the BIG event may occur simultaneously for a Bluetooth end having two antennas, or the first Bluetooth end may inform the second Bluetooth end not to receive a connection event at 100 ms in a connection event before 100 ms, but to receive a BIG event, i.e., to receive a data stream of the BIG. In this way, the ACL connection may be disconnected before 100 ms, and the data stream of the BIG starts to be received at 100 ms, and no data interaction through the ACL connection is required.

In 303, a difference between the time anchor point of the connection event and the time anchor point of the BIG event is calculated as the time offset.

The time offset is configured for the second Bluetooth end to receive, at the time anchor point of the BIG event, the data stream of the BIG sent by the first Bluetooth end.

In an example, as shown in FIG. 4, at 0 ms, the first Bluetooth end starts to send the connectable broadcast, and at 10 ms, the first Bluetooth end successfully establishes the connection with the second Bluetooth end. The first Bluetooth end performs necessary interaction with the second Bluetooth end in the event 'a', keeps the connection continuously, and determines that the event 'b' is the connection event with the second Bluetooth end after the ACL connection is established with the second Bluetooth end. The time anchor point of the event 'b' is 40 ms, and the latest BIG event after the event 'b' is the event 'c', the time anchor point of the event 'c' is 52.5 ms. The first Bluetooth end calculates the difference between the time anchor point of the event 'b' and the time anchor point of the event 'c' is 12.5 ms, and the first Bluetooth end may use 12.5 ms as the time offset. This time offset may inform the second Bluetooth end to position the time anchor point of the event 'b' first after receiving the BIGInfo, then wait more 12.5 ms, i.e., to arrive at the time anchor point of the event 'c', and receive the data stream of the BIG at the time anchor point of the event 'c'.

In an example, as shown in FIG. 4, the second Bluetooth end may turn on the RX at a preset time before reaching the time anchor point of the event 'c' after determining the time anchor point of the event 'c', to receive the data stream of the BIG when the time anchor point of the event 'c' is arrived and turn off the RX after the data stream of the BIG is received.

In another example, as shown in FIG. 4, at 0 ms, the first Bluetooth end starts to send the connectable broadcast, and at 10 ms, the first Bluetooth end successfully establishes the connection with the second Bluetooth end. The connection event determined by the first Bluetooth end after establishing the ACL connection with the second Bluetooth end is the event 'd', and the time anchor point of the event 'd' is 70 ms. The latest BIG event after the event 'd' is the event 'e', and the time anchor point of the event 'e' is 100 ms. The first Bluetooth end calculates a difference between the time anchor point of the event 'd' and the time anchor point of the event 'e' is 30 ms, and the first Bluetooth end uses the 30 ms as the time offset. This time offset may inform the second Bluetooth end to position the time anchor point of the event 'd' first after receiving the BIGInfo, then wait more 30 ms, i.e., to arrive at the time anchor point of the event 'e', and receive the data stream of the BIG at the time anchor point of the event 'e'.

In implementation, the BIGInfo includes a BIG value, i.e., a BIG offset field, and a BIG value calculation unit, i.e., a BIG offset unit field. The first Bluetooth end may convert the time offset into the two above fields after obtaining the time offset and insert the two above fields into the BIGInfo.

In an embodiment, the first Bluetooth end may further send instruction information corresponding to the identity information of the second Bluetooth end to the second Bluetooth end through the ACL connection after acquiring the identity information of the second Bluetooth end through the ACL connection. The instruction information is configured to indicate a BIS received by the second Bluetooth end from the data stream of the BIG.

In implementation, the first Bluetooth end may set a plurality of BISs corresponding to different identity information of the second Bluetooth ends in the BIG event in the data stream of the BIG for the connected second Bluetooth ends with different identity information. The first Bluetooth end may send the same BIGInfo to all the second Bluetooth ends, and the first Bluetooth end may also send instruction information indicating that the second Bluetooth end receives the BIS from the data stream of the BIG to the second Bluetooth end according to the identity information of the second Bluetooth end, to specify certain one or some BISs received by the second Bluetooth end from the data stream of the BIG. The first Bluetooth end actively sends the instruction information, which enhances the capability of the first Bluetooth end to control the second Bluetooth end.

In an example, the first Bluetooth end provide five BISs in the BIG event in the data stream of the BIG. A first BIS is a BIS to be received by the VIP user, and a third BIS is a BIS to be received by the ordinary user. If the first Bluetooth end determines that the second Bluetooth end is the VIP user after obtaining the identity information of the second Bluetooth end, the first Bluetooth end sends instruction information indicating that the second Bluetooth end receives the first BIS from the data stream of the BIG to the second Bluetooth end. If the second Bluetooth end is the ordinary user, the first Bluetooth end sends instruction information indicating that the second Bluetooth end receives the third BIS from the data stream of the BIG to the second Bluetooth end.

In an embodiment, the first Bluetooth end may send the instruction information corresponding to the identity information of the second Bluetooth end to the second Bluetooth end by carrying the instruction information corresponding to the identity information of the second Bluetooth end in the BIGInfo. The first Bluetooth end sends different BIGInfo to the second Bluetooth terminals with different identity information, and the second Bluetooth end receives only the BIS required by itself according to the instruction information included in the BIGInfo, which reduces the power consumption of the second Bluetooth end and prevent receiving data irrelevant to itself.

In an example, the first Bluetooth end provides five BISs in the BIG event in the data stream of the BIG. The first BIS is the BIS to be received by the VIP user, and the third BIS is the BIS to be received by the ordinary user. The first Bluetooth end may carry in the BIGInfo instruction information indicating that the second Bluetooth end receives the first BIS from the data stream of the BIG, and send the BIGInfo carrying this instruction information to the second Bluetooth end of the VIP user. The first Bluetooth end may also carry in the BIGInfo instruction information indicating that the second Bluetooth end receives the third BIS from the data stream of the BIG, and send the BIGInfo carrying this instruction information to the second Bluetooth end of the ordinary user.

Figure 5:
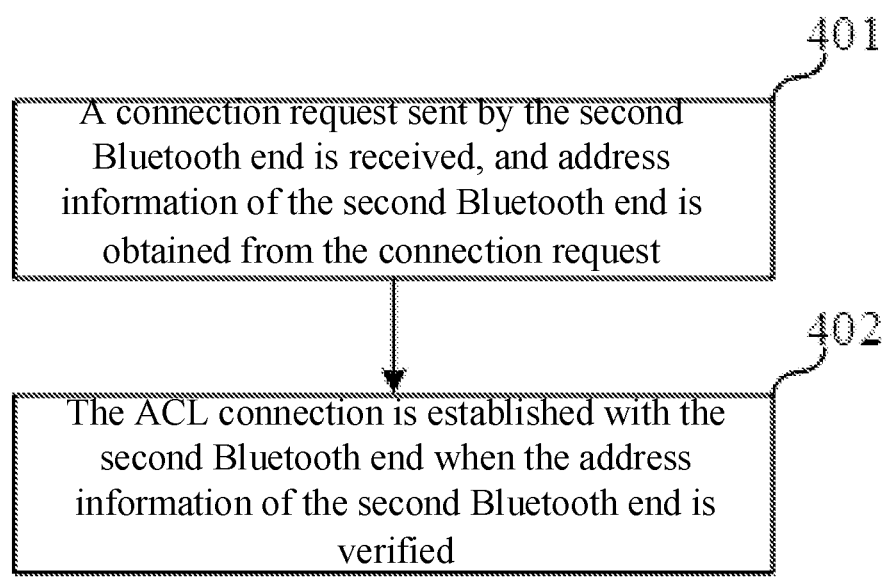
FIG. 5 is a flowchart of establishing an ACL connection with a second Bluetooth end provided in an embodiment of the present disclosure.

In an embodiment, the establishment of the connection with the second Bluetooth end may be implemented by operations shown in FIG. 5 as follows.

In 401, a connection request sent by the second Bluetooth end is received, and address information of the second Bluetooth end is obtained from the connection request.

In 402, the ACL connection is established with the second Bluetooth end when the address information of the second Bluetooth end is verified.

The address information is configured to represent validity of the second Bluetooth end.

In implementation, during establishing the ACL connection with the second Bluetooth end according to the connectable broadcast, the first Bluetooth end may first receive the connection request sent by the second Bluetooth end according to the connectable broadcast, and obtain the address information of the second Bluetooth end from the connection request. The first Bluetooth end internally stores a preset blacklist of the address information. If the address information of the second Bluetooth end is absent in the preset blacklist of the address information, the first Bluetooth end determines the address information of the second Bluetooth end as a valid address, i.e., being verified, and establishes the ACL connection with the second Bluetooth end. That is, before the first Bluetooth end selects the second Bluetooth ends according to the identity information of the second Bluetooth ends, the first Bluetooth end removes the invalid second Bluetooth end according to the address information of the second Bluetooth end first, and then performs the second round of the selecting according to the identity information of the second Bluetooth ends, so that double selecting is realized, and the privacy and security of the transmission process of the data stream of the BIG are further improved.

In an embodiment, the connectable broadcast sent by the first Bluetooth end includes beacon information, and the beacon information is configured to inform the second Bluetooth end to establish the ACL connection with the first Bluetooth end according to the connectable broadcast. Compared with a conventional connection mode in which the second Bluetooth end queries the first Bluetooth end whether the first Bluetooth end is able to be connected after the connectable broadcast is scanned by the second Bluetooth end and the first Bluetooth end feeds back the query, the method in the embodiment of the present disclosure, in which the connectable broadcast including the beacon information is sent to inform the second Bluetooth end in advance to establish the ACL connection with the first Bluetooth end according to the connectable broadcast, reduces unnecessary information interaction and further improves the transmission efficiency of the data stream of the BIG.

In an embodiment, the first Bluetooth end may disconnect the ACL connection established with the second Bluetooth end after determining that the second Bluetooth end receives the data stream of the BIG sent by the first Bluetooth end, thereby saving power consumption of the first Bluetooth end and improving working efficiency of the first Bluetooth end.

Figure 6:
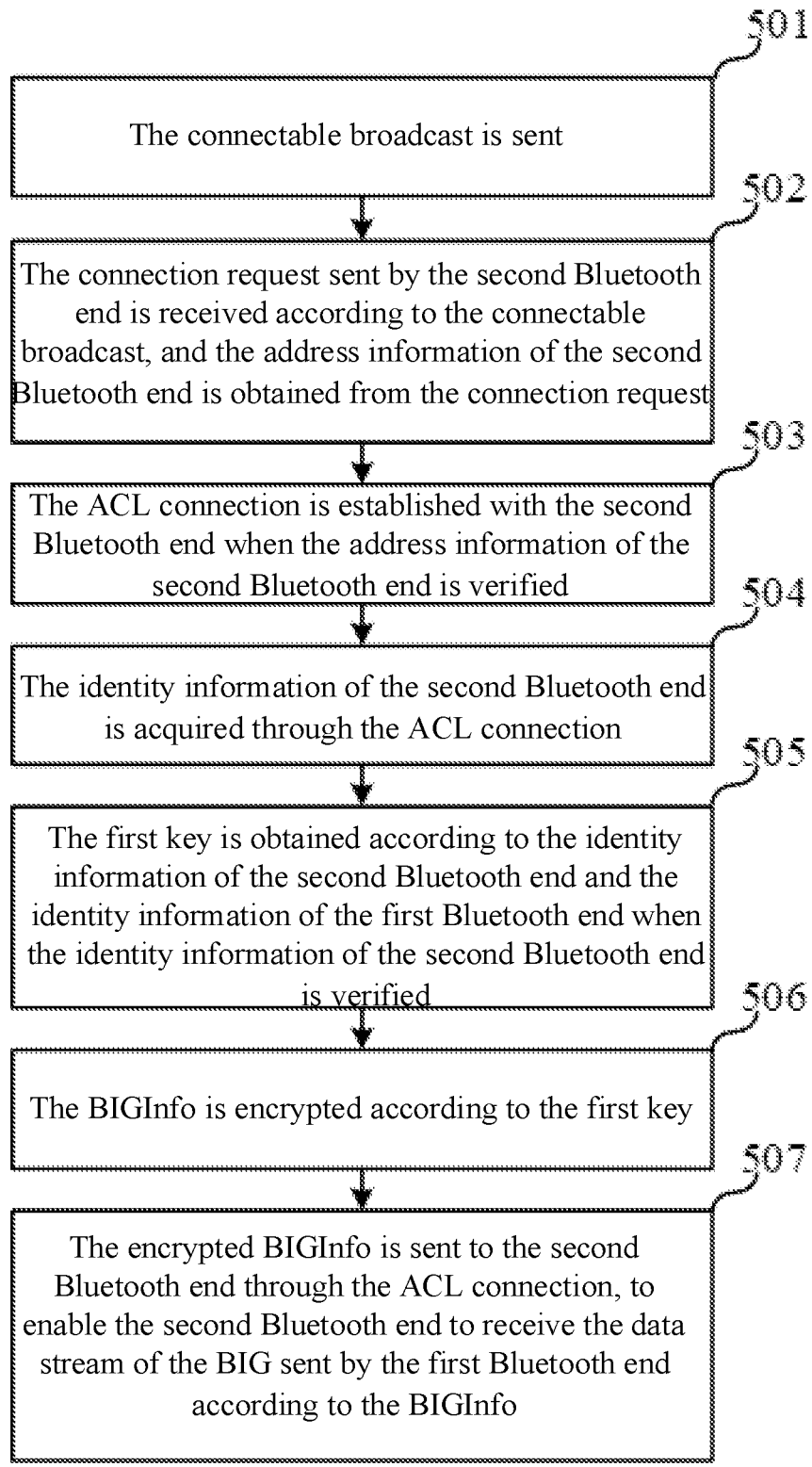
FIG. 6 is a flowchart 3 of a method for data transmission provided in an embodiment of the present disclosure.

In an embodiment, a flowchart of a method for data transmission may refer to FIG. 6, which includes the following operations.

In 501, the connectable broadcast is sent.

In 502, the connection request sent by the second Bluetooth end is received according to the connectable broadcast, and the address information of the second Bluetooth end is obtained from the connection request.

In 503, the ACL connection is established with the second Bluetooth end when the address information of the second Bluetooth end is verified.

In 504, the identity information of the second Bluetooth end is acquired through the ACL connection.

In 505, the first key is obtained according to the identity information of the second Bluetooth end and the identity information of the first Bluetooth end when the identity information of the second Bluetooth end is verified.

In 506, the BIGInfo is encrypted according to the first key.

In 507, the encrypted BIGInfo is sent to the second Bluetooth end through the ACL connection, to enable the second Bluetooth end to receive the data stream of the BIG sent by the first Bluetooth end according to the BIGInfo.

Figure 7:
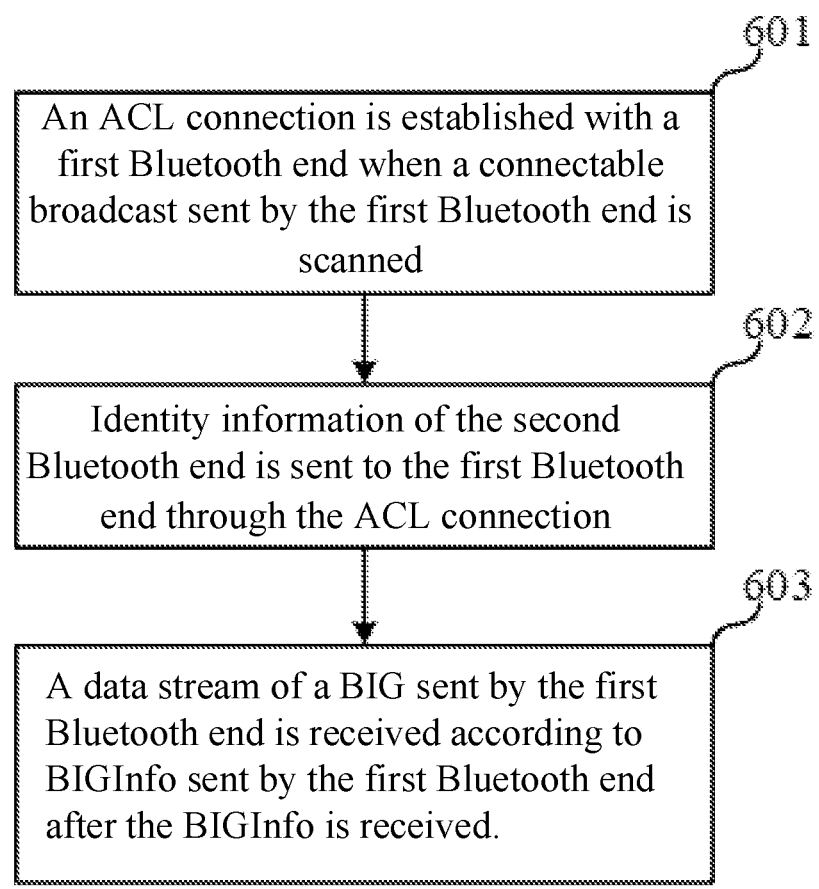
FIG. 7 is a flowchart 4 of a method for data transmission provided in an embodiment of the present disclosure.

An embodiment of the present disclosure provides a method for data transmission applied at a second Bluetooth end. A flowchart of the method for data transmission in the embodiment may refer to FIG. 7, which includes the following operations.

In 601, an ACL connection is established with a first Bluetooth end when a connectable broadcast sent by the first Bluetooth end is scanned.

In 602, identity information of the second Bluetooth end is sent to the first Bluetooth end through the ACL connection.

In 603, a data stream of a BIG sent by the first Bluetooth end is received according to BIGInfo sent by the first Bluetooth end after the BIGInfo is received.

In the embodiment of the present disclosure, the second Bluetooth end scans the connectable broadcast sent by the first Bluetooth end to establish the ACL connection with the first Bluetooth end, sends the identity information of the second Bluetooth end to the first Bluetooth end through the ACL connection, and acquires the BIGInfo sent by the first Bluetooth end through the ACL connection. That is, only the second Bluetooth end that establishes the ACL connection with the first Bluetooth end is capable of receiving the BIGInfo, so that only the second Bluetooth end that establishes the ACL connection with the first Bluetooth end is capable of receiving the data stream of the BIG, thereby effectively improving privacy and security of the transmission process of the data stream of the BIG.

In an embodiment, the first Bluetooth end does not need to send the connectable broadcast. The first Bluetooth end and the second Bluetooth end may establish a SCO connection first, and then send the identity information of the second Bluetooth end to the second Bluetooth end through the SCO connection to implement the function of selecting the second Bluetooth end.

In an embodiment, in 603, the BIGInfo sent by the first Bluetooth end and received the second Bluetooth end is BIGInfo corresponding to the identity information of the second Bluetooth end. The identity information is configured to represent a type of the second Bluetooth end.

In implementation, the first Bluetooth end pre-stores correspondences between the identity information and the BIGs, i.e., the first Bluetooth end may establish a plurality of BIGs for the connected second Bluetooth ends with different identity information, each BIG has its own dedicated BIGInfo. A second Bluetooth end may receive BIGInfo of a BIG corresponding to identity information of the second Bluetooth end sent by the first Bluetooth end, i.e., the second Bluetooth end is able to receive only a data stream of the BIG corresponding to its own identity information and unable to receive data streams of BIGs corresponding to other identity information, thereby further improving the privacy and security of the transmission process of the data stream of the BIG.

For example, the first Bluetooth end needs to send an airport announcement for a VIP user and an airport announcement for an ordinary user. The first Bluetooth end may establish two BIGs based on the VIP user and the ordinary user. The first Bluetooth end sends a data stream of a first BIG including the airport announcement for the VIP user in the first BIG, and sends a data stream of a second BIG including the airport announcement for the ordinary user in the second BIG. If the second Bluetooth end receives BIGInfo of the BIG corresponding to the VIP user (i.e., BIGInfo of the first BIG), the second Bluetooth end may receive a data stream of the BIG including the airport announcement for the VIP user according to the BIGInfo of the BIG corresponding to the VIP user. If the second Bluetooth end receives BIGInfo of the BIG corresponding to the ordinary user (i.e., BIGInfo of the second BIG), the second Bluetooth end may receive a data stream of the BIG including the airport announcement for the ordinary user according to the BIGInfo of the BIG corresponding to the ordinary user.

Figure 8:
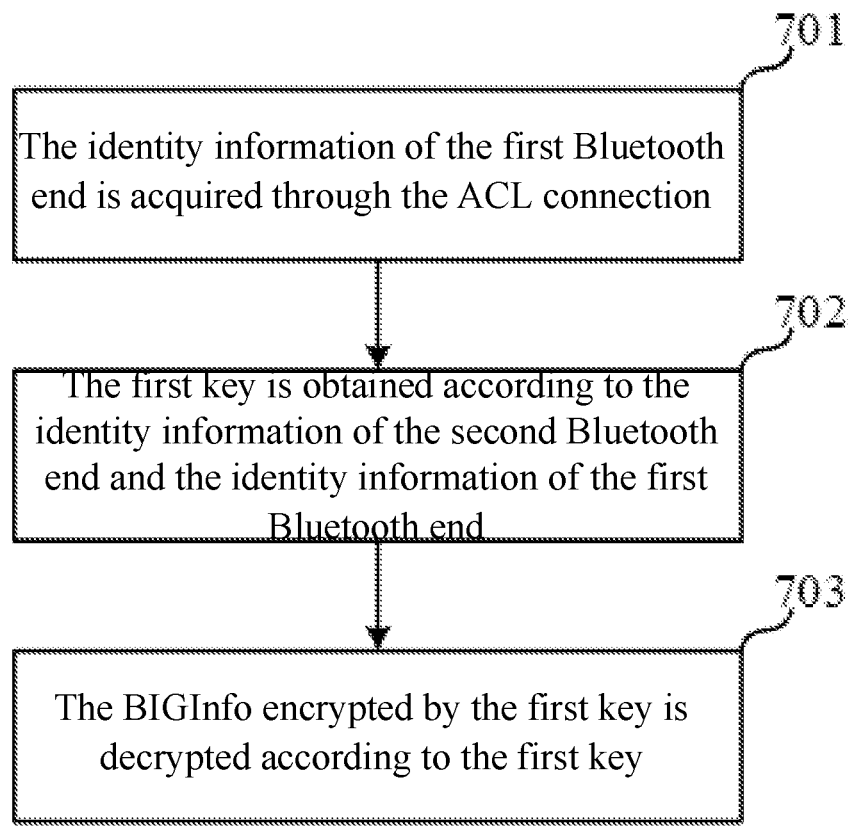
FIG. 8 is a flowchart of a second Bluetooth end decrypting BIGInfo encrypted by a first key provided in an embodiment of the present disclosure.

In an embodiment, the BIGInfo sent by the first Bluetooth end to the second Bluetooth end is encrypted by the first key, and the second Bluetooth end may decrypt the BIGInfo encrypted by the first key through operations shown in FIG. 8 as follows.

In 701, the identity information of the first Bluetooth end is acquired through the ACL connection.

In 702, the first key is obtained according to the identity information of the second Bluetooth end and the identity information of the first Bluetooth end.

In 703, the BIGInfo encrypted by the first key is decrypted according to the first key.

In implementation, after receiving the BIGInfo sent by the first Bluetooth end through the ACL connection, the second Bluetooth end may first acquire the identity information of the first Bluetooth end based on the ACL connection established between the first Bluetooth end and the second Bluetooth end, generate the first key in real time based on a preset encryption method with reference to the identity information of the second Bluetooth end and the identity information of the first Bluetooth end, and decrypt the BIGInfo encrypted by the first key according to the first key. The preset encryption method may be set for the Bluetooth end at the time of factory shipment, or may be obtained by downloading corresponding software, thereby ensuring that the second Bluetooth end knows which preset encryption method the first Bluetooth end is encrypted based on. The encrypted BIGInfo may be stolen only when the preset encryption method, the identity information of the second Bluetooth end, and the identity information of the first Bluetooth end are simultaneously stolen. The embodiment of the present disclosure effectively improves the difficulty of information disclosure caused by the encrypted BIGInfo being cracked by the offender, thereby further improving the privacy and security of the transmission process of the data stream of the BIG.

In an embodiment, the data stream of the BIG is encrypted by a preset second key, the BIGInfo includes the second key, and the second Bluetooth end may decrypt the data stream of the BIG encrypted by the second key according to the second key after receiving the data stream of the BIG sent by the first Bluetooth end.

In implementation, the second key included in the BIG-Info may be GIV, GSKD, or the like, which is not specifically limited in this embodiment of the present disclosure.

In an embodiment, the first key is different from the second key, and two different encryptions of the transmission process of the data stream of the BIG are realized, thereby improving the privacy and security of the transmission process of the data stream of the BIG.

Figure 9:
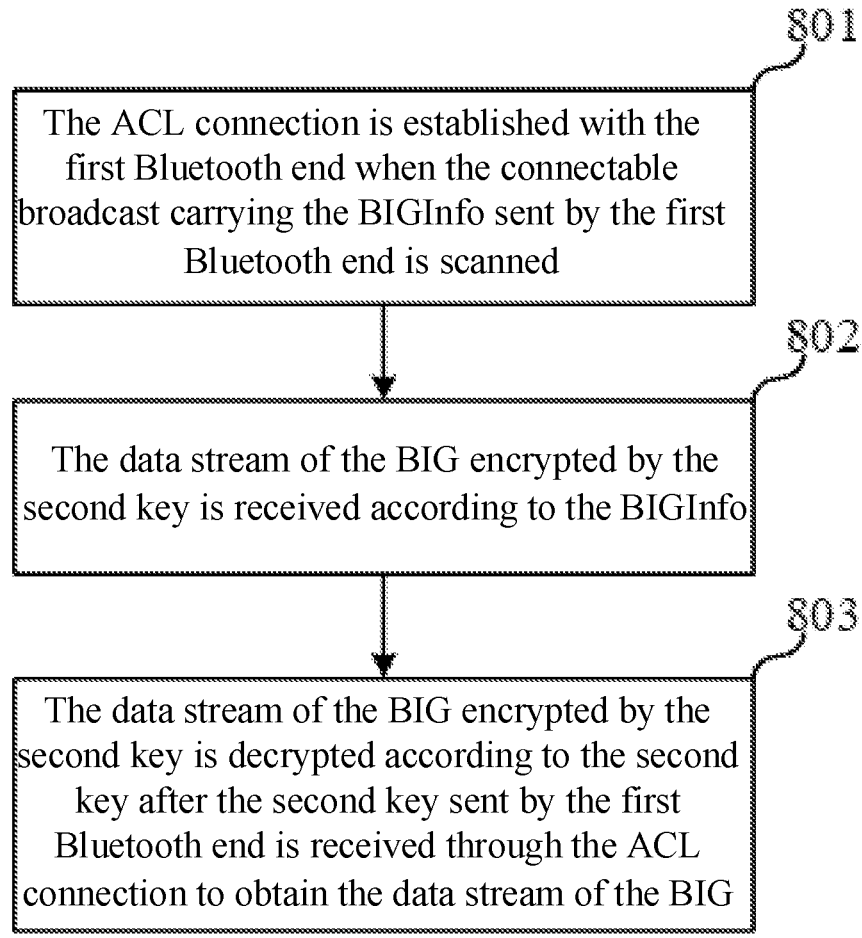
FIG. 9 is a flowchart 5 of a method for data transmission provided in an embodiment of the present disclosure.

In an embodiment, the data stream of the BIG is encrypted by the second key. The method for data transmission in this embodiment is shown in FIG. 9, which includes the following operations.

In 801, the ACL connection is established with the first Bluetooth end when the connectable broadcast carrying the BIGInfo sent by the first Bluetooth end is scanned.

In 802, the data stream of the BIG encrypted by the second key is received according to the BIGInfo.

In 803, the data stream of the BIG encrypted by the second key is decrypted according to the second key after the second key sent by the first Bluetooth end is received through the ACL connection to obtain the data stream of the BIG.

In implementation, the first Bluetooth end may carry the BIGInfo in the connectable broadcast to enable the second Bluetooth end to acquire the BIGInfo. The second Bluetooth end may acquire the data stream of the BIG encrypted by the second key according to the BIGInfo after acquiring the BIGInfo. The second Bluetooth end may establish the ACL connection with the first Bluetooth end according to the connectable broadcast, and acquire the second key sent by the first Bluetooth end through the ACL connection. Only the second Bluetooth end receiving the second key is capable of decrypting the data stream of the BIG encrypted by the second key to obtain the data stream of the BIG, so that the first Bluetooth end has the capability of selecting the second Bluetooth ends receiving the data stream of the BIG, thereby effectively improving the privacy and security of the transmission process of the data stream of the BIG. The second key may be obtained in real time based on the identity information of the first Bluetooth end and the identity information of the second Bluetooth end, or may be preset by a person skilled in the art according to actual needs.

In an embodiment, the first Bluetooth end may first create an extended broadcast, and then create a periodic broadcast based on the extended broadcast, and carry the BIGInfo in the periodic broadcast. The second Bluetooth end may acquire the BIGInfo after being synchronized with the periodic broadcast. Meanwhile, the first Bluetooth end may create the connectable broadcast. After the connectable broadcast is scanned, the second Bluetooth end may establish the ACL connection with the first Bluetooth end according to the connectable broadcast, and receive the second key sent by the first Bluetooth end through the ACL connection. The second Bluetooth end may decrypt the data stream of the BIG encrypted by the second key according to the second key to acquire the data stream of the BIG.

In an embodiment, the BIGInfo includes a time offset. The first Bluetooth end may first determine a connection event with the second Bluetooth end after establishing the ACL link connection with the second Bluetooth end, record a time anchor point of the connection event, then determine a time anchor point of a latest BIG event after the connection event, and finally calculate a difference between the time anchor point of the connection event and the time anchor point of the latest BIG event. The calculated difference is used as the time offset. After receiving the BIGInfo, the second Bluetooth end may receive, at the time anchor point of the latest BIG event, a data stream of the BIG sent by the first Bluetooth end according to the time offset included in the BIGInfo.

In an embodiment, the second Bluetooth end may further receive instruction information corresponding to the identity information of the second Bluetooth end sent by the first Bluetooth end after sending the identity information of the second Bluetooth end to the first Bluetooth end through the ACL connection. The instruction information is configured to indicate a BIS received by the second Bluetooth end from the data stream of the BIG.

In an embodiment, the second Bluetooth end may receive the instruction information sent by the first Bluetooth end through acquiring the instruction information corresponding to the identity information of the second Bluetooth end carried in the BIGInfo.

In an embodiment, the second Bluetooth end may disconnect the connection established with the first Bluetooth end after receiving the data stream of the BIG sent by the first Bluetooth end according to the BIGInfo, thereby saving power consumption of the first Bluetooth end and improving the working efficiency of the first Bluetooth end.

For clarity of description, the operations of the above methods may be combined into one operation, or some operations may be split into multiple operations, which are within the protection scope of the present disclosure as long as they include the same logical relationship. Adding irrelevant modifications or introducing irrelevant designs to the algorithm or process, but not changing a core design of the algorithm and process are within the protection scope of the present disclosure.

Figure 10:
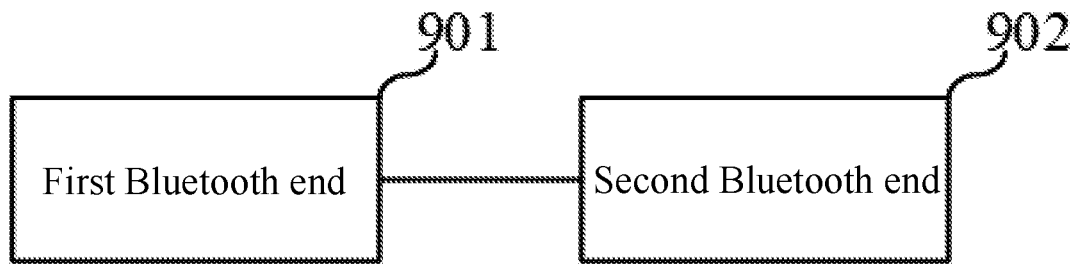
FIG. 10 is a schematic diagram of the system for data transmission provided in an embodiment of the present disclosure.

An embodiment of the present disclosure relates to a system for data transmission. Details of the system for data transmission in this embodiment are described in detail below. The following contents are merely provided for convenience of understanding the implementation details, and are not necessary for implementing this embodiment. FIG. 10 is a schematic diagram of the system for data transmission in this embodiment. The system for data transmission includes a first Bluetooth end 901 and a second Bluetooth end 902.

The first Bluetooth end 901 establishes an ACL connection with the second Bluetooth end 902.

The first Bluetooth end 901 is configured to acquire identity information of the second Bluetooth end 902 through the ACL connection, and send BIGInfo to the second Bluetooth end 902 through the ACL connection when the identity information of the second Bluetooth end 902 is verified.

The second Bluetooth terminal 902 is configured to send the identity information of the second Bluetooth end 902 to the first Bluetooth end 901 through the ACL connection, and receive a data stream of a BIG sent by the first Bluetooth end 901 according to the BIGInfo sent by the first Bluetooth end 901 after receiving the BIGInfo.

This embodiment is a system embodiment corresponding to the above method embodiment, and this embodiment can be implemented in cooperation with the above method embodiment. The related technical details and technical effects mentioned in the above embodiment are still valid in this embodiment, and are not described herein to reduce repetition. Accordingly, the related technical details mentioned in this embodiment can also be applied to the above embodiment.

It should be noted that each module involved in this embodiment is a logical module. In actual application, a logical unit may be a physical unit or a part of the physical unit, or may be implemented in a combination of a plurality of physical units. Further, in order to highlight the inventive part of the present disclosure, a unit which is not closely related to solving the technical problems proposed in the present disclosure is not introduced in this embodiment, but this does not mean that there are no other units in this embodiment.

Figure 11:
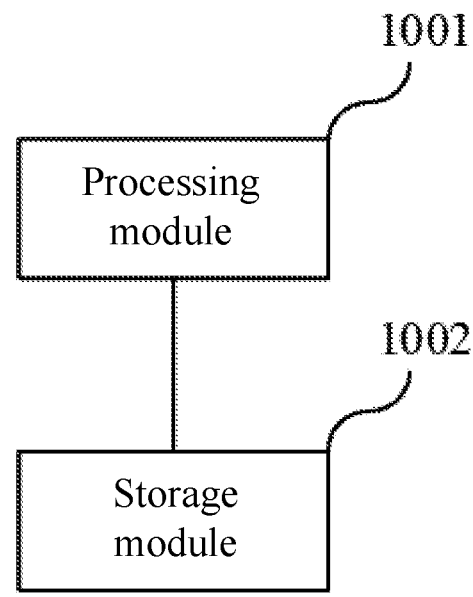
FIG. 11 is a schematic structural diagram of a chip provided in an embodiment of the present disclosure.

An embodiment of the present disclosure further provides a chip. As shown in FIG. 11, the chip includes a processing module 1001 and a storage module 1002 connected to the processing module 1001. The storage module 1002 stores instructions executable by the processing module 1001, and the instructions are executed by the processing module 1001 to cause the processing module 1001 to perform the method for data transmission in any of the above embodiments.

An embodiment of the present disclosure further provides an electronic device including a chip shown in FIG. 11 and a Bluetooth antenna connected to the chip.

An embodiment of the present disclosure further provides a computer readable storage medium storing a computer program, and the computer program, when executed by a processor, causes the processor to perform the method for data transmission in above method embodiments.

That is, it will be understood by those skilled in the art that all or a portion of the operations of the method in the embodiments described above may be implemented by a program instructing relevant hardware, and the program is stored in a storage medium that includes several instructions configured to cause a device (which may be a single chip microcomputer, a chip, or the like) or a processor to perform all or a portion of the operations of the method in the embodiments described herein. The storage medium includes a USB flash drive, a removable hard disk, a read-only memory (ROM), a random access memory (RAM), a magnetic disk, an optical disk, or any other medium capable of storing program code.

Those skilled in the art should appreciate that the embodiments described above are specific embodiments for implementing the present disclosure. In practice, however, various changes may be made in the forms and details of the specific embodiments without departing from the scope of the present disclosure.

What is claimed is:

1. A method for data transmission, applied at a first Bluetooth end, comprising:
    establishing a point-to-point connection with a second Bluetooth end;
    acquiring identity information of the second Bluetooth end through the point-to-point connection; and
    sending broadcast isochronous group information (BIGInfo) to the second Bluetooth end through the point-to-point connection when the identity information of the second Bluetooth end is verified, to enable the second Bluetooth end to receive a data stream of a broadcast isochronous group (BIG) sent by the first Bluetooth end according to the BIGInfo;
    wherein sending the BIGInfo to the second Bluetooth end through the point-to-point connection comprises:
    sending the BIGInfo of the BIG corresponding to the identity information of the second Bluetooth end to the second Bluetooth end through the point-to-point connection according to a pre-stored correspondence between the identity information and the BIG; wherein the identity information is configured to characterize a type of the second Bluetooth end;
    wherein the point-to-point connection comprises an asynchronous connection-oriented logical transport (ACL) connection, and before establishing the point-to-point connection with the second Bluetooth end, the method further comprises:
    sending a connectable broadcast, wherein the connectable broadcast is configured to establish the ACL connection with the second Bluetooth end;
    wherein sending the connectable broadcast comprises:
    sending a connectable broadcast including beacon information, wherein the beacon information is configured to trigger the second Bluetooth end to establish a connection with the first Bluetooth end according to the connectable broadcast; and
    wherein establishing the point-to-point connection with the second Bluetooth end comprises:
    receiving a connection request sent by the second Bluetooth end, and acquiring address information of the second Bluetooth end from the connection request, wherein the address information is configured to represent validity of the second Bluetooth end; and establishing the ACL connection with the second Bluetooth end when the address information of the second Bluetooth end is verified.

2. The method for data transmission according to claim 1, wherein the BIGInfo is encrypted by a first key, and the first key is acquired according to the identity information of the second Bluetooth end and identity information of the first Bluetooth end.

3. The method for data transmission according to claim 2, wherein the data stream of the BIG is encrypted by a second key that is preset, and the BIGInfo comprises the second key;
wherein the second key comprises any one of a group initialization vector (GIV) and a group session key diversifier (GSKD).

4. The method for data transmission according to claim 1, wherein the BIGInfo comprises a time offset obtained by the first Bluetooth end by:
determining a connection event with the second Bluetooth end after establishing the point-to-point connection with the second Bluetooth end, and recording a time anchor point of the connection event;
determining a time anchor point of a latest BIG event after the connection event; and
calculating a difference between the time anchor point of the connection event and the time anchor point of the latest BIG event as the time offset; wherein the time offset is configured for the second Bluetooth end to receive, at the time anchor point of the latest BIG event, the data stream of the BIG sent by the first Bluetooth end.

5. The method for data transmission according to claim 1, wherein after acquiring the identity information of the second Bluetooth end through the point-to-point connection, the method further comprises:
sending instruction information corresponding to the identity information of the second Bluetooth end to the second Bluetooth end through the point-to-point connection; wherein the instruction information is configured to indicate a broadcast isochronous stream (BIS) received by the second Bluetooth end from the data stream of the BIG.

6. The method for data transmission according to claim 5, wherein sending the instruction information corresponding to the identity information of the second Bluetooth end to the second Bluetooth end comprises:
carrying the instruction information corresponding to the identity information of the second Bluetooth end in the BIGInfo.

7. A method for data transmission, applied at a second Bluetooth end, comprising:
establishing a point-to-point connection with a first Bluetooth end;
sending identity information of the second Bluetooth end to the first Bluetooth end through the point-to-point connection; and
receiving a data stream of a broadcast isochronous group BIG sent by the first Bluetooth end according to broadcast isochronous group information BIGInfo sent by the first Bluetooth end after receiving the BIGInfo; wherein the first Bluetooth end sends the BIGInfo to the second Bluetooth end through the point-to-point connection when the identity information of the second Bluetooth end is verified;
wherein the BIGInfo sent by the first Bluetooth end is BIGInfo of the BIG corresponding to the identity information of the second Bluetooth end; wherein the identity information is configured to characterize a type of the second Bluetooth end;
wherein the point-to-point connection comprises an asynchronous connection-oriented logical transport (ACL) connection, and before the point-to-point connection with the first Bluetooth end is established, a connectable broadcast is sent by the first Bluetooth end to establish the ACL connection with the second Bluetooth end;
wherein the connectable broadcast comprises beacon information configured to trigger the second Bluetooth end to establish a connection with the first Bluetooth end according to the connectable broadcast; and
wherein establishing the point-to-point connection with the first Bluetooth end comprises:
sending a connection request to the first Bluetooth end to enable the first Bluetooth end to acquire address information of the second Bluetooth end from the connection request, wherein the address information is configured to represent validity of the second Bluetooth end; and
establishing the ACL connection with the first Bluetooth end when the address information of the second Bluetooth end is verified.

8. The method for data transmission according to claim 7, wherein the BIGInfo is encrypted by a first key; and
before receiving the data stream of the BIG sent by the first Bluetooth end according to the BIGInfo, the method further comprises:
acquiring identity information of the first Bluetooth end through the point-to-point connection;
acquiring the first key according to the identity information of the second Bluetooth end and the identity information of the first Bluetooth end; and
decrypt the BIGInfo encrypted by the first key according to the first key.

9. The method for data transmission according to claim 8, wherein the data stream of the BIG is encrypted by a second key that is preset, and the BIGInfo comprises the second key; and
after receiving the data stream of the BIG snet by the first Bluetooth end, the method further comprises:
decrypt the data stream of the BIG encrypted by the second key according to the second key; wherein the second key comprises any one of a group initialization vector (GIV) and a group session key diversifier (GSKD).

10. The method for data transmission according to claim 7, wherein the BIGInfo comprises a time offset obtained by the first Bluetooth end by:
determining a connection event with the second Bluetooth end after establishing the point-to-point connection with the second Bluetooth end, and recording a time anchor point of the connection event;
determining a time anchor point of a latest BIG event after the connection event; and
calculating a difference between the time anchor point of the connection event and the time anchor point of the latest BIG event as the time offset;
wherein receiving the data stream of the BIG sent by the first Bluetooth end according to the BIGInfo comprises:
receiving, at the time anchor point of the latest BIG event, the data stream of the BIG sent by the first Bluetooth end according to the time offset.

11. The method for data transmission according to claim 7, wherein after sending the identity information of the second Bluetooth end to the first Bluetooth end, the method further comprises:
receiving instruction information corresponding to the identity information of the second Bluetooth end sent by the first Bluetooth end; wherein the instruction information is configured to indicate a broadcast isochronous stream BIS received by the second Bluetooth end from the data stream of the BIG.

12. The method for data transmission according to claim 11, wherein receiving the instruction information corresponding to the identity information of the second Bluetooth end sent by the first Bluetooth end comprises:
acquiring instruction information corresponding to the identity information of the second Bluetooth terminal carried in the BIGInfo.

13. The method for data transmission according to claim 7, wherein after receiving the data stream of the BIG sent by the first Bluetooth end according to the BIGInfo, the method further comprises:
disconnect the point-to-point connection established with the first Bluetooth end.

14. A system for data transmission, comprising: a first Bluetooth end and a second Bluetooth end; wherein:
the first Bluetooth end establishes a point-to-point connection with the second Bluetooth end;
the first Bluetooth end is configured to acquire identity information of the second Bluetooth end through the point-to-point connection, and send broadcast isochronous group information (BIGInfo) to the second Bluetooth end through the point-to-point connection when the identity information of the second Bluetooth end is verified; and
the second Bluetooth end is configured to send the identity information of the second Bluetooth end to the first Bluetooth end through the point-to-point connection, and receive a data stream of a broadcast isochronous group (BIG) sent by the first Bluetooth end according to the BIGInfo sent by the first Bluetooth end after receiving the BIGInfo;
wherein sending the BIGInfo to the second Bluetooth end through the point-to-point connection comprises:
sending the BIGInfo of the BIG corresponding to the identity information of the second Bluetooth end to the second Bluetooth end through the point-to-point connection according to a pre-stored correspondence between the identity information and the BIG; wherein the identity information is configured to characterize a type of the second Bluetooth end;
wherein the point-to-point connection comprises an asynchronous connection-oriented logical transport (ACL) connection, and before establishing the point-to-point connection with the second Bluetooth end, the first Bluetooth end is further configured to:
send a connectable broadcast, wherein the connectable broadcast is configured to establish the ACL connection with the second Bluetooth end;
wherein sending the connectable broadcast comprises:
sending a connectable broadcast including identity information, wherein the identity information is configured to trigger the second Bluetooth end to establish a connection with the first Bluetooth end according to the connectable broadcast; and
wherein establishing the point-to-point connection with the second Bluetooth end comprises:
receiving a connection request sent by the second Bluetooth end, and acquiring address information of the second Bluetooth end from the connection request, wherein the address information is configured to represent validity of the second Bluetooth end; and
establishing the ACL connection with the second Bluetooth end when the address information of the second Bluetooth end is verified.

15. The system for data transmission according to claim 14, wherein the BIGInfo is encrypted by a first key, and the first key is acquired according to the identity information of the second Bluetooth end and identity information of the first Bluetooth end; wherein the data stream of the BIG is encrypted by a second key that is preset, and the BIGInfo comprises the second key; and wherein the second key comprises any one of a group initialization vector (GIV) and a group session key diversifier (GSKD).

* * * * *